United States Patent Office 2,778,807
Patented Jan. 22, 1957

2,778,807

OIL EXTENDED SYNTHETIC RUBBER COMPOSITIONS

Jesse K. Boggs, Princeton, Francis P. Ford, Roselle, and James H. McAteer, Cranford, N. J., assignors to Esso Research and Engineering Company, a corporation of Delaware No Drawing. Application May 26, 1953,
Serial No. 357,628

4 Claims. (Cl. 260—33.6)

This invention relates to improved oil extended-synthetic rubber compositions and relates more particularly to synthetic rubber compositions containing fractions of naphthenic crudes from which a large part of the aromatics has been removed.

It is known to add naphthenic and aromatic hydrocarbon oils to natural and synthetic rubbers, such as GR–S or GR–I as plasticizers and extenders. These oils are good plasticizers and their low cost reduces the cost per pound of the finished rubber. Vulcanizates prepared from such oil-rubber compounds, for example, tire tread stocks, often possess wearing properties superior to those of vulcanizates produced from unextended, lower Mooney synthetic polymers.

The utility of a petroleum oil as an extender is determined by its physical and chemical properties. Not all oils are satisfactory. Thus only oils containing less than 10–20% of constituents boiling below about 700° F., at atmospheric pressure have sufficiently low volatilities to avoid excessive losses from the vulcanizates during use; similarly, other things being equal, the viscosity of a preferred extender oil should be as low as possible for ease in factory handling.

It has now been found that the chemical constitution of the extender oil has an especially profound influence on the properties of the oil-polymer compound and its vulcanizate. The hysteresis or dynamic heat build-up of an oil extended vulcanizate increases with increasing aromaticity of the oil. A useful, quantitative measure of this important vulcanizate property is its internal viscosity which will be designated here as $\eta$. Higher values of $\eta$ indicate increased hysteresis and heat build-up. Expressed in another way, the resiliency of the vulcanizate decreases with increasing $\eta$. Low values, therefore, of $\eta$ are required to obtain cool running tires and good low temperature properties.

In accordance with this invention it has been found that polymers and vulcanizates, containing extender oils derived from naphthenic crudes by selectively removing a substantial portion of the aromatic compounds initially present possess low hysteresis and high resiliency. The extender oils imparting these properties may be obtained by any of the methods known to the art. Thus, the extender oil may be obtained as a raffinate from the extraction of a naphthenic crude fraction with phenol, $SO_2$, furfural and other polar extracts or by absorption methods. The extender oil employed here may contain up to 50–55% aromatics. Preferred extenders, however, contain less than 40–45% aromatics. These values are based on measurements obtained by percolating the oil through silica gel followed by elution with selective solvents to separate non-aromatic and aromatic constituents as described in the art.

Accordingly, therefore, the main object of the invention is the provision of natural and/or synthetic rubber compositions and particularly synthetic rubber compositions suitable for use as tire or tube stocks; for molding purposes; for the fabrication of printer's rolls, hose, sheets, tubes, and other objects and specialties; for the preparation of adhesives and cements, and for coating, impregnating, waterproofing, and other specialized uses; comprising rubber, and particularly one or more synthetic rubbers or elastomers, and 10 to 50 parts of a naphthenic oil containing less than 10–20% of constituents boiling below about 700° F. at atmospheric pressure and which has been treated to selectively remove a substantial proportion of the aromatic compounds.

The term "rubber" as used herein is intended to define a material which does not possess a definite and reproducible softening point, and which is capable of being vulcanized.

Rubber has been defined in the prior art as follows:

A. "An organic material which shows a high elasticity of 100 percent or more at room temperature and which does not lose this property upon storage at room temperature for considerable periods."

B. "A rubber is a substance which shows an elasticity of 800% or more with a quick return (snap) at temperatures at which natural rubber shows the same effect and which does not lose this property upon storage any sooner than does natural rubber."

C. "In order to qualify as a rubber, a material should stretch readily to a considerable degree and after release retract forcefully and quickly."

The following definition is preferred.

"The term rubber is intended to embrace elastomers, whether natural or synthetic, and whether or not admixed with other ingredients such as pigments, softening agents, etc., in the vulcanized or unvulcanized state, the said elastomer being (1) capable of vulcanization such as by the application of heat when admixed with sulfur or other vulcanizing agent, or otherwise, (2) slightly soluble or substantially insoluble in bodied drying oils such as bodied linseed oil, and (3) capable, either in the unvulcanized state or at some stage in the vulcanization thereof, of being stretched readily to a considerable degree and, after release of the applied stress, retracting forcefully and quickly." The synthetic rubber to which the extender oil is added includes neoprene, butadiene-styrene copolymers, such as GR–S, butadiene-acrylonitrile copolymers, such as GR–N, and isobutylene-isoprene copolymers such as GR–1, with or without the incorporation of other additives selected from a list comprising sulfur, accelerators, pigments, resins, antioxidants, fillers, extenders, and/or other plasticizing and/or softening agents, such as stearic acid, pine oil, and pine tar.

The following examples will indicate more clearly the advantage of the present invention:

*Example I*

Oil-polymer compounds were prepared by mill-mixing, using 50 parts of oil per 100 parts of high Mooney GR–S. The compounds were cured for 60 minutes at 287° F. The properties of the extenders and vulcanizates are summarized below:

| | Dist. of Naphthenic Crude | Raffinate of Distillate |
|---|---|---|
| Extender: | | |
| Aromatics, Wt. Percent | 37 | 21 |
| Visc., SSU @ 100° F | 950 | 510 |
| Refractive Index | 1.5080 | 1.4920 |
| Vulcanizate: | | |
| Tensile, p. s. i | 2,730 | 2,690 |
| Elongation, percent | 665 | 605 |
| $\eta \times 10^{-4}$ at— | | |
| 50° C | 5.3 | 4.5 |
| −10° C | 14.9 | 12.0 |

These data demonstrate that the raffinate from the naphthenic crude distillate yielded a vulcanizate having significantly lower $\eta$ values and, in turn, greater resiliency and lower hysteresis over the temperature range shown.

*Example II*

Vulcanizates were prepared as described under Example I using a distillate fraction and a raffinate of it as extenders. The crude source of these extenders was different from and more aromatic than the source of the extenders in Example I.

|  | Distillate of Naph. Crude | Raffinate of Dist. |
|---|---|---|
| Extender: | | |
| Aromatics, Wt. Percent | 45 | 36 |
| Visc., SSU @ 100° F | 930 | 730 |
| Refractive index | 1.5149 | 1.5005 |
| Vulcanizate: | | |
| Tensile, p. s. i | 2,320 | 2,490 |
| Elongation, Percent | 640 | 660 |
| $\eta \times 10^{-4}$ at— | | |
| +50° C | 6.8 | 5.4 |
| −10° C | 22.7 | 16.2 |

As before, a pronounced decrease in $\eta$ values is shown by the vulcanizate containing the raffinate.

*Example III*

Portions of the extenders used in Example II were Banbury-mixed with high Mooney GR–S. Other conditions were the same as in Example I. The vulcanizate properties are summarized below:

|  | Distillate | Raffinate |
|---|---|---|
| Vulcanizate: | | |
| Tensile, p. s. i | 2,160 | 3,000 |
| Elongation, Percent | 420 | 480 |
| $\eta \times 10^{-4}$ at— | | |
| +50° C | 5.4 | 4.4 |
| −10° C | 15.8 | 12.1 |

Once more, the vulcanizate containing the raffinate possessed superior dynamic properties.

*Example IV*

Oil-polymer compounds were prepared by mill mixing raffinate and extract samples respectively of the distillate employed in Example I with a high molecular weight butyl polymer. The compounds contained 50 parts of extender per 100 parts of polymer and were cured for 40 minutes at 307° F. The data are summarized below:

|  | Raffinate | Extract |
|---|---|---|
| Extender: | | |
| Aromatics, Wt. percent | 21 | 75 |
| Visc., SSU @ 210° F | 58 | 150 |
| Refractive Index | 1.4920 | 1.5481 |
| Vulcanizate: | | |
| Tensile, p. s. i | 1,995 | 2,275 |
| $\eta \times 10^{-4}$ at +10° C | 9.6 | 15.8 |

These data demonstrated in a particularly dramatic manner the advantage of employing the raffinate portion of a naphthenic crude fraction as an extender. The aromatic constituents selectively removed from the original distillate and present in the extract imparted greatly increased internal viscosity to the vulcanizate with consequent decrease in resilience and increase in hysteresis.

The nature of the present invention having been thus fully set forth and specific examples of the same given, what is claimed as new and useful and desired to be secured by letters Patent is:

1. A composition comprising a vulcanized synthetic rubber prepared by mixing 100 parts of a diolefin rubbery polymer and about 10 to 50 parts by weight of a raffinate obtained by extracting from about 20 to about 43% of the aromatics from a naphthenic crude oil fraction, said raffinate containing between 0 and 21% aromatics and having less than 10 to 20% of its constituents boiling below about 700° F., and curing the mixture formed by heating same in the presence of a vulcanizing quantity of sulfur.

2. Composition according to claim 1 in which the synthetic rubber is a copolymer of butadiene and styrene.

3. Composition according to claim 1 in which the synthetic rubber is a copolymer of butadiene and acrylonitrile.

4. Composition according to claim 1 in which the synthetic rubber is a copolymer of isoprene and isobutylene.

References Cited in the file of this patent

UNITED STATES PATENTS 2,582,264    McMillan _____ Jan. 15, 1952

OTHER REFERENCES

Rostler: Rubber Age, 63, 317–326, June 1948.
Rostler: Ind. Eng. Chem., 41, 598–608, March 1949.
D'Ianni: Rubber Age, 317–321, June 1951.
Kurtz: India Rubber World, 126, 495–499, July 1952.
Weinstock et al.: Ind. Eng. Chem., 45, 1035–1043, May 1953 (received November 4, 1952).
Taft: Rubber Age, May 1954, page 223–226.

UNITED STATES PATENT OFFICE
Certificate

Patent No. 2,778,807　　　　　　　　　　　　　　　Patented January 22, 1957

Jesse K. Boggs, Francis P. Ford and James H. McAteer

Application having been made jointly by Jesse K. Boggs, Francis P. Ford and James H. McAteer, the inventors named in the patent above identified, and Esso Research and Engineering Company, a corporation of Delaware, the assignee, for the issuance of a certificate under the provisions of Title 35, Section 256 of the United States Code, deleting the names of the said Jesse K. Boggs and James H. McAteer, as joint inventors, and a showing and proof of facts satisfying the requirements of the said section having been submitted, it is this 24th day of April 1962, certified that the names of the said Jesse K. Boggs and James H. McAteer are hereby deleted from the said patent as joint inventors with the said Francis P. Ford.

[SEAL]

EDWIN L. REYNOLDS,
*First Assistant Commissioner of Patents.*